United States Patent
Khan et al.

(10) Patent No.: US 7,746,953 B1
(45) Date of Patent: Jun. 29, 2010

(54) METHOD AND APPARATUS FOR ASYNCHRONOUS INCREMENTAL REDUNDANCY TRANSMISSION IN A COMMUNICATION SYSTEM

(75) Inventors: Farooq Ullah Khan, Manalapan, NJ (US); Sanjiv Nanda, Clarksburg, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 3148 days.

(21) Appl. No.: 09/660,098

(22) Filed: Sep. 12, 2000

(51) Int. Cl.
*H04L 27/00* (2006.01)
(52) U.S. Cl. ..................................................... 375/295
(58) Field of Classification Search ................ 375/295, 375/259; 455/69, 522; 714/746; 370/468, 370/219, 229, 231–237, 252, 254, 347, 389, 370/442, 470; 708/525
See application file for complete search history.

(56) References Cited

U.S. PATENT DOCUMENTS 6,144,653 A * 11/2000 Persson et al. .............. 370/337
6,505,034 B1 * 1/2003 Wellig ........................ 455/69
7,123,617 B1 * 10/2006 Abrol ......................... 370/394

FOREIGN PATENT DOCUMENTS

WO  WO 99/12269  3/1999
WO  WO 00/45543  8/2000

OTHER PUBLICATIONS

Andrew S. Tanenbaum, "Computer Networks Third Edition", 1996, Prentic-Hall International, Inc., pp. 213-219.
European Search Report, 2002.

* cited by examiner

*Primary Examiner*—Sam K Ahn
(74) *Attorney, Agent, or Firm*—Carlson, Gaskey & Olds, P.C.

(57) ABSTRACT

Information is coded and segmented into a plurality of sub-packets. Each sub-packet contains identification information and a one-bit information status flag indicating whether the information is 'new' information or 'continue' information. The information to be transmitted is then applied to a scheduling algorithm that determines when the information is to be transmitted, how much information is to be transmitted and how many attempts at a successful transmission of the information is allowed. In this manner, the transmission of information can be performed in an asynchronous manner.

6 Claims, 1 Drawing Sheet

METHOD AND APPARATUS FOR ASYNCHRONOUS INCREMENTAL REDUNDANCY TRANSMISSION IN A COMMUNICATION SYSTEM

RELATED APPLICATION

Related subject matter is disclosed in the following application concurrently filed herewith: U.S. patent application entitled "Method and Apparatus For Asynchronous Incremental Redundancy Reception In A Communication System", Ser. No. 09/660,092, filed Sep. 12, 2000, now U.S. Pat. No. 7,206,280.

BACKGROUND OF THE INVENTION

1. Field of the Invention

The present invention relates to a method for an Automatic Repeat Request (ARQ) technique for communication systems.

2. Description of the Related Art

The quality of communication channels within communication systems determines the efficiency of the communication system. One measure of efficiency is the system's throughput. The throughput is the amount of information that is successfully transmitted and received in a communication system for a defined period of time. It is therefore a goal of service providers (owners and operators of communication systems) to have as many of their communication channels as possible operating at an acceptable throughput.

In wireless communication systems, the communication channels used by a subscriber of such a system are commonly known as the air interface. The air interface is used for the exchange of information between a mobile (e.g., cell phone) and a base station or other communication system equipment. The air interface comprises a plurality of communication channels. The quality of any one of the channels of the air interface varies. Thus, for example, any particular channel between the base station and a mobile may have an acceptable throughput at one instant and unacceptable throughput at another instant. Service providers not only want to maintain the throughput of their air interface at an acceptable level, but also want to increase the throughput as much as possible.

Many times the information transmitted through a relatively low quality communication channel is adversely affected to such an extent that the information contains errors when received. In an effort to increase the throughput of such channels, communication systems apply the technique of retransmission of information. Transmitting equipment retransmits the information to receiving equipment a certain number of times to increase the likelihood that the information, once received, contains no errors or contains an acceptable number of errors. The receiving equipment can be either system equipment such as a base station or subscriber equipment such as a cell phone. Similarly, the transmitting equipment can also be system equipment or subscriber equipment. System equipment is any equipment owned and operated by the service provider.

A widely used technique for the retransmission of information due to errors detected at the receiving equipment is called Automatic Retransmission Request (ARQ). The ARQ method is a technique of confirming that information transmitted through a communication channel has been received without any errors. Receiving equipment sends a message to transmitting equipment confirming that the transmitted information was received without errors. If the transmitted information was received with errors, the receiving equipment sends a message to the transmitting equipment asking the transmitter to retransmit the information. The transmitter can retransmit all or part of the previously transmitted information using the same or different channel coding.

ARQ is typically used in concert with channel coding. Channel coding is the creation of redundancy in the transmitted information to allow receiving equipment to check as well as correct for errors. Also, the receiving equipment performs a corresponding decoding operation to obtain the information. The decoding operation is performed by a decoder. Two of the main ARQ methods are the Selective Retransmit (SR) protocol and the Stop-and-Wait protocol. In both SR ARQ and Stop-and-Wait ARQ, the concept of Incremental Redundancy (IR) is used. Incremental Redundancy (IR) and/or soft combining, are techniques used to improve the efficiency of ARQ. In IR, the receiving equipment attempts to combine, in the decoder, retransmitted information along with earlier transmissions of the same information that used the same or different coding. The decoding of combined information improves the performance of the decoding operation and increases the likelihood of successful decoding; decoding of combined information reduces the number of retransmissions that would be required to successfully receive the transmitted information. In the prior art, IR schemes that operate with SR ARQ and with Stop-and-Wait ARQ have been defined.

In the IR scheme operating with SR ARQ, data is typically encoded, formatted and packaged as packets comprising payload, header and trailer portions. The trailer and header portions are overhead in that they do not contain subscriber information; they contain information identifying the subscriber (i.e., identification information) and information on how to process the packet (i.e., process information). The information identifying the particular subscriber from whom the information in the payload of the packet originated is kept in the header. Also, the header contains information on how to soft combine, at the decoder, the received packets so as to properly decode the payload information.

An arbitrary number of copies of each block of information can be sent so that the original information can be derived from one or from a combination of the received packets of information. Different subscribers can transmit different amounts of information and at different rates. As described above, however, much information is needed to describe how the information is to be processed once it is received. The SR protocol is not bandwidth efficient because of the excessive overhead information. However, without the use of the header information, the receiving equipment is not able to identify, and properly combine and decode the received packets of information. To reduce the likelihood that the header information is contaminated resulting in errors, the header portion of the packets is heavily coded. The heavy coding is more robust coding that requires more redundancy to be added to the header information. Thus, the heavy coding creates even more overhead which reduces the throughput of the communication channels thus reducing the efficiency of the communication system.

In the IR scheme with Stop-and-Wait ARQ protocol, a block of information is coded into n packets where n is an integer equal to 2 or greater. Each one of the packets by itself or in combination with another packet or a portion of another packet can be used to decode the original block of information. One or more of the packets are transmitted during a time slot(s) assigned to a particular subscriber. The transmitted packets are received and decoded. If the decoding was successful (i.e., no errors detected or an acceptable number of errors detected), the receiving equipment transmits an ACK (ACKnowledge) message to the transmitting equipment indicating that the information was properly decoded and that a new block of information can be transmitted. If the decoding was unsuccessful (i.e., error detected or an unacceptable number of errors detected), the receiving equipment transmits a NACK (Negative ACKnowledge) which is an indication to the transmitting equipment to retransmit another group of packets (or another single packet) representing the same block of information. The ACK message is thus an example of a positive confirmation message and the NACK message is an example of a negative confirmation message. Upon reception of a NACK message the receiving equipment stores the received error-containing packet. The receiving equipment will attempt to combine this stored packet with subsequent repeat packet transmissions for the same block of information, to properly decode the information within such block. The ACK or NACK confirmation messages are hereinafter referred to as the ACK/NACK messages.

The receiving equipment transmits the ACK/NACK message following the reception of a packet in a particular time slot assigned to a subscriber. Thus, the ACK/NACK messages are transmitted in accordance with a particular timing relationship to the packet reception. The transmit equipment associates a particular ACK/NACK message with a particular packet transmission based on the time slot or the time period within which such a message was received. For example, an ACK/NACK message received during slot period m corresponds to a packet transmission in slot m-k, where k represents a particular number (including fractions of time slots) of time slots which is fixed by the communication system; m is an integer equal to 1 or greater an k is a number greater than zero. The number of time slots represented by k is a roundtrip delay for transmitting equipment representing the time elapsed between a transmission of a packet and the reception of a responding ACK/NACK message.

Upon receipt of a NACK (in a particular time slot) in response to a packet transmission, the transmitting equipment transmits a repeat packet representing the same block of information. The transmitting equipment transmits the repeat packet transmission a certain number of time slots following the receipt of the ACK/NACK message. Thus, the repeat packet is transmitted in accordance with a particular timing relationship to the received ACK/NACK message.

The receive equipment associates a particular repeat packet transmission with a ACK/NACK message based on the time slot or the time period within which such a message was received. For example, a repeat packet transmission received during slot period n corresponds to a ACK/NACK message transmitted in slot n-j, where j represents a certain number (including fractions of time slots) of time slots which is fixed by the communication system; n is an integer equal to 1 or greater and j is a number greater than zero. The number of time slots represented by j is a roundtrip delay for receiving equipment representing the time elapsed between the transmission of an ACK/NACK message and the reception of a repeat packet. Therefore, there is no need to transmit identification information in the headers of the packets because the packets can be identified and soft combined based on the time slot in which they were received.

The Stop-and-Wait protocol in the prior art is thus a Synchronous Protocol in that the repeat packet transmission are transmitted within a strict timing relationship (defined by the communication system) between transmitting equipment and receiving equipment. Consecutive packet transmissions of the same block of data are separated by a time period usually expressed in terms of number of slots where such time period is constant. In sum, when a transmission is made, an ACK/NACK message indicating a NACK (or ACK) followed by a repeated packet transmission (or a new packet transmission) must be transmitted a certain fixed number of slots later.

The Stop-and-Wait protocol as implemented in the prior art, has several drawbacks stemming from its synchronous nature and the manner in which it is typically implemented. Because of the strict timing relationship imposed on the transmissions, it is very difficult to accommodate different subscribers having different transmission rates or different roundtrip delays. Subscribers having different transmission rates transmit (or receive) information within different number of assigned consecutive time slots. For example, some subscribers use three time slots to transmit (or receive) their block of information while others use only one time slot. The transmission roundtrip delay is the amount of time elapsed between consecutive transmission of packets or group of packets. In the Stop-and-Wait protocol, the transmission roundtrip delay is kept fixed.

When a packet associated with a particular subscriber is transmitted, the transmitting equipment expects to receive an ACK or NACK within a certain number of time slots later, i.e., the ACK/NACK messages have a fixed roundtrip delay. Once the transmitting equipment receives the ACK/NACK message it transmits a new packet or transmits a repeat packet, i.e., a packet containing previously transmitted information. During the time period between transmissions, other transmissions (associated with other subscribers) can occur. However, due to a fixed transmission roundtrip delay, once the number of slots equaling the transmission roundtrip delay has elapsed, the next slot must be used for a new packet or a repeat packet transmission because the slot is reserved for such purpose. In other words, the other transmissions must be completed prior to the occurrence of the time slot reserved for the transmission of packets associated with a particular subscriber. The transmitting equipment is thus constrained to transmitting packets at predefined times for a particular subscriber. The constraint on time of transmission removes a great amount of flexibility from the transmitting equipment to transmit information during times of favorable channel conditions. Many communication systems have the capability to monitor the quality of their communication channels. It would be desirable for the transmitting equipment to either postpone or delay the transmission of information through a particular channel until that channel has favorable conditions. In this manner, the communication system can improve its throughput. However, because of the strict timing relationship imposed by the Stop-and-Wait protocol, the transmitting equipment, many times, is unable to take advantage of favorable channel conditions.

Another drawback with the Stop-and-Wait protocol is that it is not adaptable to changing channel conditions because the number of initial transmissions or retransmissions is fixed. In many cases the quality of a communication channel is such that a relatively large number of attempts, i.e., retransmissions, is needed to transmit an initial packet successfully. Depending on the channel conditions, the number of transmissions necessary to successfully transmit a packet may be more than what is allocated for that packet. When the number of attempts surpasses the number allocated, the subscriber is either dropped from the system or the block of information containing errors is accepted raising the error rate of the communication channel.

Therefore, what is needed is an ARQ technique that accommodates different subscribers having different transmission rates, different information lengths and different roundtrip delays. What is further needed is an ARQ technique which allows the transmitting equipment to schedule its transmissions during favorable channel conditions whenever possible so as to increase the throughput of that channel and thus the overall throughput of the communication system.

SUMMARY OF THE INVENTION

The present invention provides a method which implements an ARQ technique used with Incremental Retransmission (IR) that allows transmitting equipment in a communication system to operate asynchronously. The transmitting equipment applies the information to be transmitted to a scheduling algorithm that determines the time of transmission of information associated with a particular subscriber and the amount of information to be transmitted. The information to be transmitted contains an information status flag indicating whether the information is NEW information or CONTINUE information. The information to be transmitted also contains identification information identifying the particular subscriber associated with the information. The transmitting equipment is thus not only able to schedule its transmissions, but also decide how much information is to be transmitted and how many attempts at a successful transmission is allocated to a particular subscriber. The method of the present invention can be used in wireless communication systems and other types of communication systems.

The information is preferably packaged into packets. Each packet is coded into a plurality of sub-packets. Each sub-packet has an information status flag in its header. The information status flag indicates whether a sub-packet is the beginning of information (i.e., NEW information) or the continuation of information that is being transmitted (i.e., CONTINUE information). Each sub-packet also contains subscriber identification information to associate the sub-packet to a particular subscriber. Thus, the format of the transmitted sub-packets gives the transmitting equipment the ability to indicate the packet boundaries, i.e., the beginning of each new packet is indicated by the value of the information status flag. Because the packet boundaries are identified and the subscriber associated with each sub-packet is known, the transmitter is able to operate in an asynchronous manner. As a result of being able to operate asynchronously, the transmitter can use various scheduling algorithms to prioritize the transmissions or retransmissions for different subscribers based on, for example, the conditions of the communication channels through which the sub-packets are transmitted and various other factors.

In a preferred embodiment, each sub-packet contains a one-bit NEW/CONTINUE flag as its information status flag. For a particular subscriber, when the beginning of a packet is being transmitted, the information status flag of the corresponding packet is set to NEW. When the continuation of information is being transmitted or when a retransmission is performed, the flag is set to CONTINUE. After the transmission of a sub-packet is performed, the transmitter waits for a confirmation message from corresponding receiving equipment. Preferably, an ACK is used for positive confirmation messages and a NACK is used for negative confirmation messages. Depending on the received confirmation message, the transmitter will either transmit NEW information or CONTINUE information. For the same subscriber, the transmitting equipment will then determine: (a) when to perform the next transmission (b) the information rate of the next transmission and (c) the amount of information to be transmitted (e.g., amount of information contained in a sub-packet) based on the results of a scheduling algorithm to which the information to be transmitted is applied. The transmitting equipment is able to execute a particular scheduling algorithm adopted by the service provider of the communication system.

DETAILED DESCRIPTION

Figure 1:
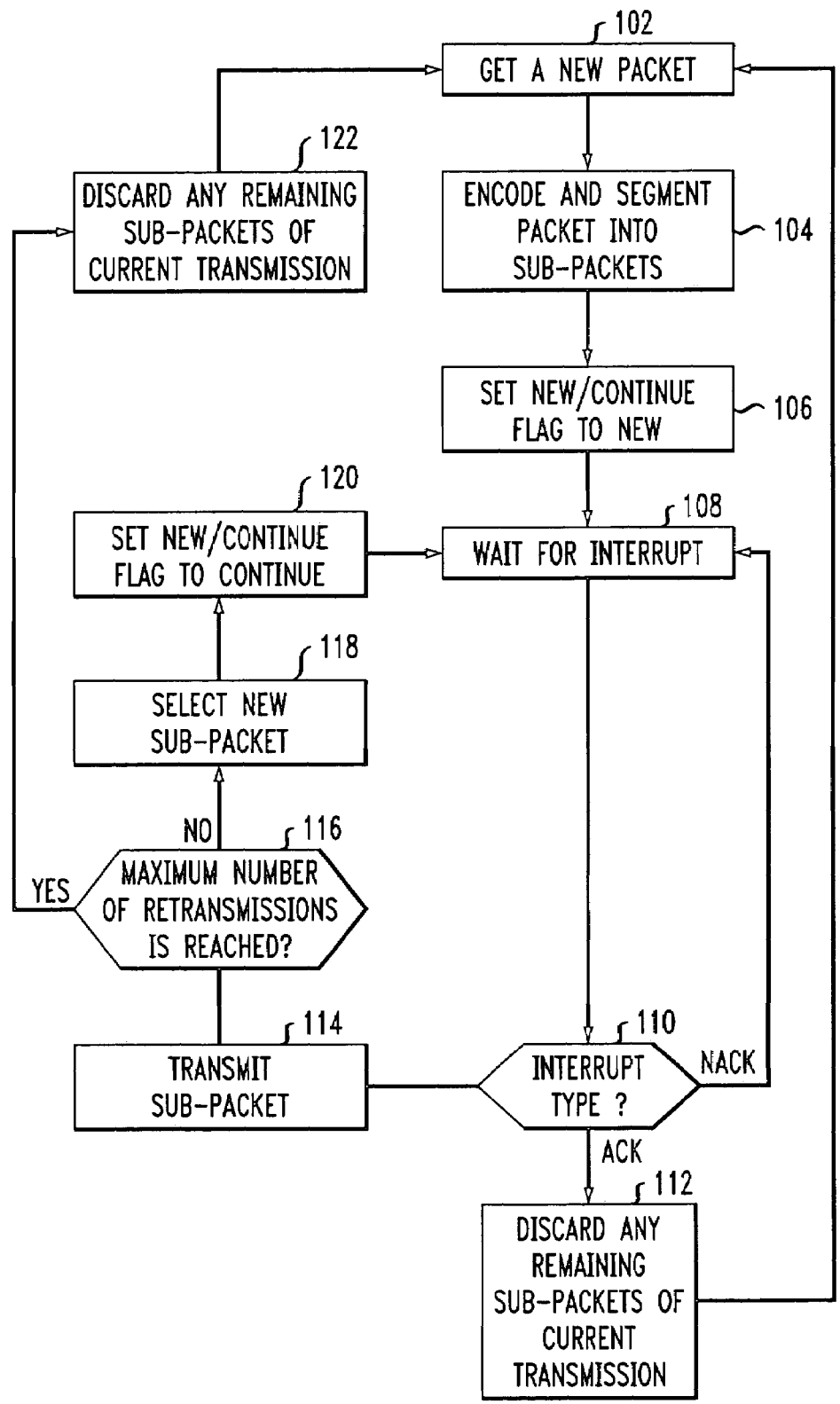
FIG. 1 shows a flowchart depicting the steps of the method of the present invention.

The present invention provides a method which implements an ARQ technique used with Incremental Retransmission (IR) that allows transmitting equipment in a communication system to operate asynchronously. The transmitting equipment applies the information to be transmitted to a scheduling algorithm that determines the time of transmission of the information associated with a particular subscriber and the amount of information in the transmission. The information to be transmitted is provided with an information status flag indicating whether the information is NEW or CONTINUE information. The present invention also provides an apparatus that transmits information asynchronously by applying the information to a scheduling algorithm that determines the time of transmission and the amount to be transmitted. The apparatus can be implement with digital and/or analog hardware, microprocessor and/or digital processor based circuitry used in conjunction with firmware and/or software. The apparatus is configured to reside in both transmitting equipment and receiving equipment.

Referring to FIG. 1, there is shown the method of the present invention for transmitting equipment in a communication system that uses ARQ. For ease of explanation, the method of the present invention will be explained in the context of three packets of information transmitted consecutively whereby each packet is coded and is then segmented into a plurality of sub-packets. Each sub-packet contains, preferably in its header, an information status flag indicating whether the sub-packet is NEW information or CONTINUE information. NEW information is the beginning of information that is being transmitted for the first time. CONTINUE information represents information that follows the NEW information and is part of the NEW information. CONTINUE information is thus the continuation of previously transmitted information or the retransmission of previously transmitted information that was decoded unsuccessfully. The information status flag is preferably a one-bit NEW/CONTINUE flag where a "0" bit indicates that the sub-packet is CONTINUE information and a "1" bit indicates that the sub-packet is NEW information. Because the flag uses only one bit, the coding of this flag does not use much overhead even when heavy coding is used. It should be noted that the NEW/CONTINUE flag can be stored anywhere in a sub-packet or in any other type of block of information. Further, the NEW/CONTINUE flag can be more than one bit. For example, the NEW/CONTINUE flag can be implemented with two bits wherein each two bit value not only identifies the type of information contained in the sub-packet but also identifies the particular sub-packet in terms of the sequence of sub-packets. The two-bit flag thus assists equipment receiving the sub-packets to perform various operations such as decoding and combining of packets. For example, a two-bit flag for a group of 3 packets may be used as follows:

00—NEW sub-packet; 01—CONTINUE sub-packet 1; 10—CONTINUE sub-packet 2; 11—CONTINUE sub-packet 3. It should also be noted that the NEW/CONTINUE flag and the identification information may be transmitted separately from the sub-packet payload. For example, the identification information and the information status flag can be transmitted and received on a separate code multiplexed channel in a CDMA (Code Division Multiple Access) communication system, or separate time slots may be reserved for these fields in a TDMA (Time Division Multiple Access) communication system.

The three packets of information are $A_1$, $A_2$ and $A_3$ where $A_1$ is segmented into three sub-packets $a_{11}$, $a_{12}$ and $a_{13}$. Similarly, packets $A_2$ and $A_3$ are each segmented into three sub-packets $a_{21}$, $a_{22}$, $a_{23}$ and $a_{31}$, $a_{32}$, $a_{33}$ respectively. Packet $A_1$ is first transmitted followed by packet $A_2$ and then packet $A_3$. It should be noted that each of the sub-packets by themselves or in combination with other sub-packets or other portions of sub-packets can be used to decode the original information contained in the packet.

In step 102 of FIG. 1, a new packet is obtained by the transmitting equipment, i.e., packet $A_1$ is obtained. In step 104, packet $A_1$ is encoded and segmented. Any well known coding technique can be used to encode packet $A_1$ and all following packets. The encoded packet $A_1$ is segmented into three sub-packets $a_{11}$, $a_{12}$ and $a_{13}$ where each sub-packet contains a NEW/CONTINUE flag in its header. Each sub-packet also contains identification information. It should be noted that the length of each sub-packet might require more than one time slot for transmission. In step 106, the transmitting equipment sets the flag of sub-packet $a_{11}$ to NEW.

In step 108, the transmitting equipment applies the first sub-packet to be transmitted, i.e., sub-packet $a_{11}$, to a scheduling algorithm or sub-packet priority scheme that determines when the sub-packet is to be transmitted. The method of the present invention then waits for an interrupt signal in the form of an ACK/NACK message or an interrupt signal from the scheduling algorithm. The scheduling algorithm may, for example, depend on the conditions of the communication channel through which sub-packet $a_{11}$ is to be transmitted. The scheduling algorithm may depend on other factors such as the time of day, the quality of service agreed upon between the service provider and the subscriber associated with packet $A_1$ or even the availability of communication channels. The scheduling algorithm handles many sub-packets from various subscribers and determines when a particular sub-packet is to be transmitted; the scheduling algorithm generates an interrupt signal (or scheduler request signal) requesting the transmitting equipment to transmit sub-packet $a_{11}$. Also in step 108 the transmitting equipment is monitoring the communication channel assigned to the subscriber for a confirmation message (e.g., ACK/NACK message) responding to an immediate previous transmission. At this point, an ACK/NACK message is not expected because sub-packet $a_{11}$ is the first sub-packet being transmitted. When an interrupt signal is received the method of the present invention moves to step 110.

In step 110, the method of the present invention determines the type of interrupt signal received, i.e., ACK, NACK or scheduler request. Continuing with our example, the method of the present invention moves to step 114 since the interrupt signal received was a scheduler request. In step 114, the transmitting equipment transmits sub-packet $a_{11}$. In step 116, the transmitting equipment determines whether the maximum number of transmissions allowed for the subscriber has been reached. The method of the present invention allows each subscriber a maximum number of retransmissions based on various factors such as the quality of service paid by the subscriber, the amount of information being handled by the communication system and the condition of the communication channel assigned to the subscriber. Other well known factors can be used by the service provider. Suppose the maximum number of retransmissions for the subscriber associated with packet $A_1$ is 3. Therefore, at this point the method of the present invention moves to step 118 since there has been no retransmissions so far. In step 118, the next sub-packet, i.e., $a_{12}$, associated with the current packet being transmitted is selected. In step 120 the transmitting equipment sets the NEW/CONTINUE flag of sub-packet $a_{12}$ to CONTINUE. The method of the present invention now moves to step 108 to once again wait for an interrupt. Suppose the transmitted sub-packet $a_{11}$ was received and decoded successfully and consequently an ACK message is transmitted. The ACK message is transmitted indicating that the information contained in sub-packet $a_{11}$, was successfully decoded. Therefore, the transmission of sub-packet $a_{11}$ was a successful transmission. The transmitting equipment detects the message in step 108 and in step 110 determines that the message is an ACK message. The method of the present invention now moves to step 112 where the remaining sub-packets associated with packet $A_1$ (i.e., sub-packets $a_{12}$ and $a_{13}$) are discarded.

The method of the present invention now moves to step 102 and selects a new packet $A_2$. In step 104 packet $A_2$ is encoded and segmented into sub-packets $a_{21}$, $a_{22}$ and $a_{23}$. In step 106 sub-packet $a_{21}$ has its NEW/CONTINUE flag set to NEW. In step 108, sub-packet $a_{21}$ is applied to the scheduling algorithm and the method of the present invention waits for an interrupt signal. In step 110, an interrupt signal has been received and it is determined to be a scheduler request. Accordingly, the method of the present invention moves to step 114 and transmits sub-packet $a_{21}$ and in step 116 determines that the maximum number of retransmissions allocated for this subscriber has not been reached. Suppose the maximum number of retransmissions allocated for the subscriber associated with packet $A_2$ is 3. Since the number of retransmissions at this point is 0, the method of the present invention moves to step 118 where sub-packet $a_{22}$ is selected. In step 120 the transmitting equipment sets the NEW/CONTINUE flag of sub-packet $a_{22}$ to CONTINUE and moves to step 108 where it applies sub-packet $a_{22}$ to a scheduling algorithm and waits for an interrupt signal. An interrupt signal is received and in step 110, it is determined to be a NACK signal. The method of the present invention returns to step 108 and again waits for an interrupt signal.

An interrupt signal is again received and it is determined in step 110 to be a scheduler request. Accordingly, the method of the present invention moves to step 114 where sub-packet $a_{22}$ is transmitted. In step 116, the maximum number has not been reached since there has been only 1 retransmission associated with packet $A_2$ thus far. The method of the present invention therefore moves to step 118 where sub-packet $a_{23}$ is selected and in step 120 the NEW/CONTINUE flag of sub-packet $a_{23}$ is set to CONTINUE. The method of the present invention moves to step 108 where it applies sub-packet $a_{23}$ to a scheduling algorithm and waits for interrupt signal, which it receives at some later time. In step 110, it is determined that the interrupt signal is another NACK signal causing the method of the present invention to return to step 108 to wait for an interrupt signal. The interrupt signal is received and, in step 110, it is determined to be a scheduler request causing sub-packet $a_{23}$ to be transmitted in step 114. In step 116, it is determined that the number of retransmissions thus far is 2 and thus the method of the present invention moves to step 118 where sub-packet $a_{21}$ is again selected. Note that sub-packet $a_{21}$ is being selected a second time because the method of the present invention selects the sub-packets in round robin fashion so that the same sub-packets are selected repeatedly and retransmitted until the maximum number of retransmissions is reached. In step 120 the NEW/CONTINUE flag of sub-packet $a_{21}$ is set to CONTINUE.

The method of the present invention moves to step 108, applies sub-packet $a_{21}$ to a scheduling algorithm and waits for an interrupt signal. In step 110, the interrupt signal is determined to be yet another NACK signal causing the method of the present invention to return to step 108 to wait for another interrupt signal. Upon reception of the interrupt signal, the method of the present invention moves to step 110 where it is determined to be a scheduler request. The method of the present invention moves to step 114 where it transmits sub-packet $a_{21}$. In step 116, it is determined that the number of retransmission is now 3 which is the maximum number allocated for the subscriber associated with packet $A_2$. Therefore, the method of the present invention moves to step 122 where all sub-packets segmented from packet $A_2$ are discarded and in step 102 a new packet, i.e., $A_3$, is selected. At this point, the confirmation message corresponding to the last transmission for packet $A_2$ is yet to be received. Regardless of whether the confirmation message is a NACK or an ACK, the method of the present invention will not transmit any more transmissions associated with packet $A_2$. The subscriber may wish to retransmit packet $A_2$, but only after this packet has been once again coded and applied to the method of the present invention. The sub-packets segmented from packet $A_3$ are then transmitted in accordance with the method of the present invention as described above.

Another version of the method of the present invention allows the transmitting equipment to transmit information based only on interrupt signals from the scheduler algorithm. One or all of the sub-packets segmented from a packet are transmitted upon the receipt of an interrupt signal from the scheduling algorithm. Any confirmation messages (i.e., ACK or NACK) received are ignored. The sub-packets are thus transmitted based on various conditions considered by the scheduling algorithm. The method of the present invention thus performs what is commonly called link adaptation. Link adaptation is the use of communication channels at instants of time determined to be most favorable when various factors are taken into consideration. The various factors are typically channel parameters that give some type of indication of the quality of the communication channel.

We claim:

1. A method for transmission of information in a communication system, the method comprising:

providing, in information to be transmitted, identification information and an information status flag having a certain value indicating whether the information to be transmitted is NEW information or CONTINUE information;

waiting to receive an interrupt signal from a scheduling algorithm resulting from the information being applied to the scheduling algorithm; and transmitting the information from a transmitter upon reception of the interrupt signal from the scheduling algorithm responsive to a type of the interrupt signal thus allowing transmissions to occur in an asynchronous manner.

2. The method of claim 1 where the step of waiting to receive an interrupt signal comprises waiting for a configuration message in response to a previous transmission; and applying NEW information to be transmitted to the scheduling algorithm upon reception of a positive confirmation message in response to the previous transmission or selecting CONTINUE information to be transmitted and applying the CONTINUE information to be transmitted to the scheduling algorithm upon reception of a negative confirmation message in response to the previous transmission.

3. The method of claim 1 where the step of transmitting the information comprises selecting NEW information to be transmitted and applying said selected NEW information to the scheduling algorithm when an established maximum number of retransmissions of the transmitted information has been reached.

4. The method of claim 3 where any remaining CONTINUE information is discarded.

5. The method of claim 1 where the information status flag is a one-bit NEW/CONTINUE flag.

6. The method of claim 1, comprising:

receiving the interrupt signal; and determining the type of the received interrupt signal.

* * * * *